United States Patent
Kleinknecht

(10) Patent No.: US 8,250,855 B2
(45) Date of Patent: Aug. 28, 2012

(54) PROCEDURE FOR OPERATING A REDUCING AGENT METERING VALVE OF A SCR-EXHAUST GAS PURIFYING SYSTEM

(75) Inventor: Horst Kleinknecht, Fichtenberg (DE)

(73) Assignee: Robert Bosch GmbH, Stuttgart (DE)

( * ) Notice: Subject to any disclaimer, the term of this patent is extended or adjusted under 35 U.S.C. 154(b) by 834 days.

(21) Appl. No.: 12/058,202

(22) Filed: Mar. 28, 2008

(65) Prior Publication Data
US 2009/0077949 A1 Mar. 26, 2009

(30) Foreign Application Priority Data

Apr. 3, 2007 (DE) .......................... 10 2007 017 459

(51) Int. Cl.
*F01N 3/00* (2006.01)
(52) U.S. Cl. ............... 60/286; 60/274; 60/295; 60/303; 239/135; 239/136; 239/139; 251/129.05; 251/129.06; 251/129.09
(58) Field of Classification Search ............. 60/274, 60/286, 295, 301, 303; 239/135, 136, 137, 239/138, 139; 251/129.05, 129.06, 129.09, 251/129.1
See application file for complete search history.

(56) References Cited

U.S. PATENT DOCUMENTS

| | | | | |
|---|---|---|---|---|
| 5,201,341 A | * | 4/1993 | Saito et al. | 137/341 |
| 5,947,090 A | * | 9/1999 | Maeda | 123/490 |
| 6,519,935 B2 | * | 2/2003 | Weigl | 60/286 |
| 7,393,187 B2 | * | 7/2008 | Weigl | 417/413.1 |
| 7,594,516 B2 | * | 9/2009 | Maisch et al. | 137/240 |
| 7,654,080 B2 | * | 2/2010 | Ripper et al. | 60/286 |
| 2006/0013704 A1 | | 1/2006 | Sawada et al. | |
| 2008/0105838 A1 | * | 5/2008 | Koenekamp | 251/11 |

OTHER PUBLICATIONS

Robert Bosch GmbH: "Dieselmotor-Management", 2004, ISBN 3-528-23873-9, pp. 338-340.

* cited by examiner

*Primary Examiner* — Binh Q Tran
(74) *Attorney, Agent, or Firm* — Merchant & Gould P.C

(57) ABSTRACT

A procedure for dosing a reducing agent into the exhaust gas of an combustion engine with a valve is presented, which shows a solenoid and a movable seal body for adjusting a percolation profile, whose value is depending on the current through the solenoid, whereby the valve is triggered by a current profile, which shows two consecutive sectors. The procedure distinguishes itself in that it is checked in the first sector whether the valve is frozen or whether a danger of freezing exists, and that an electric energy that has been fed into the solenoid with the electric current is set in the second sector depending on the result of the checking. Furthermore a controller is introduced, which is customized for controlling the process of such a procedure.

9 Claims, 4 Drawing Sheets

PROCEDURE FOR OPERATING A REDUCING AGENT METERING VALVE OF A SCR-EXHAUST GAS PURIFYING SYSTEM

TECHNICAL FIELD

The invention is based on a procedure according to the genus of claim 1. Reducing agent metering valves that are electromagnetically controllable present a solenoid, whose magnetic field lifts off a pintle from a seal seat at a sufficiently high solenoid current so that the reducing agent metering valve opens.

BACKGROUND

Thereby the function of a first sector of a current profile is that the reducing agent metering valve is opened quickly and the function of a second sector is to keep the already opened valve open with a small average amperage in order to control a flow of reducing agent. Such a procedure as well as such a controller are known for an application in motor vehicles like automobiles and trucks from the publication Diesel motor-Management, 4th Edition, Friedrich Vieweg und Sohn Publishers, ISBN 3-528-23873-9, p. 338.

The selective reduction of nitrous oxides (SCR=selective catalytic reduction) is based on a reduction of nitrous oxides (NOx) by selected reducing agents even in the presence of oxygen. Selective means at this, that the oxidation of the reducing agent takes preferably place (selectively) with the oxygen of the nitrous oxides and not with the molecular oxygen that is essentially abundant in the exhaust gas. Ammoniac (NH3) has approved itself as reducing agent with the highest selectiveness. In motor vehicles ammoniac is not carried along in pure form, but dosed to the exhaust gas from a urea-water-solution that has been carried along. Urea (NH2) 2CO shows a very good solubility in water and can therefore be simply dosed to the exhaust gas. If it is referred to a reducing agent in this application, this term shall also describe the primary products, the vehicles and media like water, in which a vehicle or the reducing agent is contained in dissolved form. Therefore also the urea-water-solution is described in the following as reducing agent that has to be dosed.

A urea-water-solution with a mass concentration of 32.5% urea, which is known under the trade name AdBlue, has a freezing point at −11 C. A eutectic mixture establishes there, whereby an unmixing of the solution is excluded in the case of a freezing.

Even if an undesired unmixing does not occur at this composition, a freezing of the reducing agent metering valve and other components of the system, for example a freezing of conductions, has to be prevented where possible. At a frozen system the reducing agent could not be dosed anymore, which would cause increased nitrous oxide emissions of the motor vehicle. If the system should still freeze under adverse environmental conditions, it has to be rebuilt in the operation of a motor vehicle. This applies especially to the reducing agent metering valve that generally consists of several metals and synthetics. The reducing agent metering valve is arranged directly at the exhaust gas system. Therefore the danger exists that it is overheated at a hot exhaust system and hot exhaust gas. In order to prevent such a thermal damage, the reducing agent metering valve is generally provided with a cooling element, which allows a deduction of big heat quantity to the environment. In the opposite case of low temperatures the cooling element increases the risk of a freezing of the reducing agent metering valve and aggravates the defrosting of a frozen reducing agent metering valve.

SUMMARY

Against the background of this the task of the invention is to prevent a freezing of a reducing agent metering valve and/or to allow a defrosting of such a reducing agent metering valve with means as simple as possible, with costs as low as possible and with an operating safety as high as possible.

This task is solved in each case with the features of the independent claims.

As a result of checking in the first sector whether the valve is frozen or whether a danger of freezing exists and in the second sector whether the electric energy, which has been fed into the solenoid with the electric current, is adjusted depending on the result of the checking, electric energy can be fed into the solenoid need-based and partially converted over the Ohm resistance of the solenoid into Joule heating, which heats up the valve from the inside in imminent danger of freezing or a frozen valve.

By the solenoid's multiple use of the electromagnetic controllable reducing agent metering valve for controlling the percolation profile and as a heating coil, a separate heating device for the valve can be abandoned. As a result the construction of the valve is simplified. Furthermore its required space and production costs decrease, while its operating safety increases at the same time.

The checking that takes place in the first sector allows a differentiation of operating statuses without a danger of freezing and such with a danger of freezing. Thereby a heating effect can also be minimized in operating statuses without a danger of freezing, which decreases the danger of an overheating at a hot exhaust gas system and exhaust gas.

A special advantage is also that the heating effect takes place by modifying current profiles, as they are created for a percolation controlling anyways. By the limitation to such current profiles the danger of an involuntary dosage of reducing agent is minimized. An involuntary dosage could for example occur if a current flow is created by the solenoid with an intended opening of the valve, since each solenoid current creates an electromagnetic force action on to the movable seal body of the valve. As a result of such a force action the effective locking force (resulting from electromagnetic force action and mechanically created restoring force) could be reduced insofar as vibrations and convulsions that occur during driving, cause an involuntary opening of the valve. The drop of reducing agent related to this shortens the time until the next refilling of reducing agent, which is undesirable. Furthermore the involuntary opening can cause that the reducing agent does not react with nitrous oxides, but gets into the environment while releasing ammoniac, which could cause odor nuisance.

Further advantages arise from the dependent claims, the description and the attached figures.

It shall be understood that the previously mentioned and the following features that still have to be explained are applicable not only in the given combination, but also in other combinations or in unique position, without leaving the structure of the present invention.

BRIEF DESCRIPTION OF THE DRAWINGS

Embodiments of the invention are shown in the drawings and illustrated in the following description. They always show schematically.

DETAILED DESCRIPTION OF THE DRAWINGS

Figure 1:
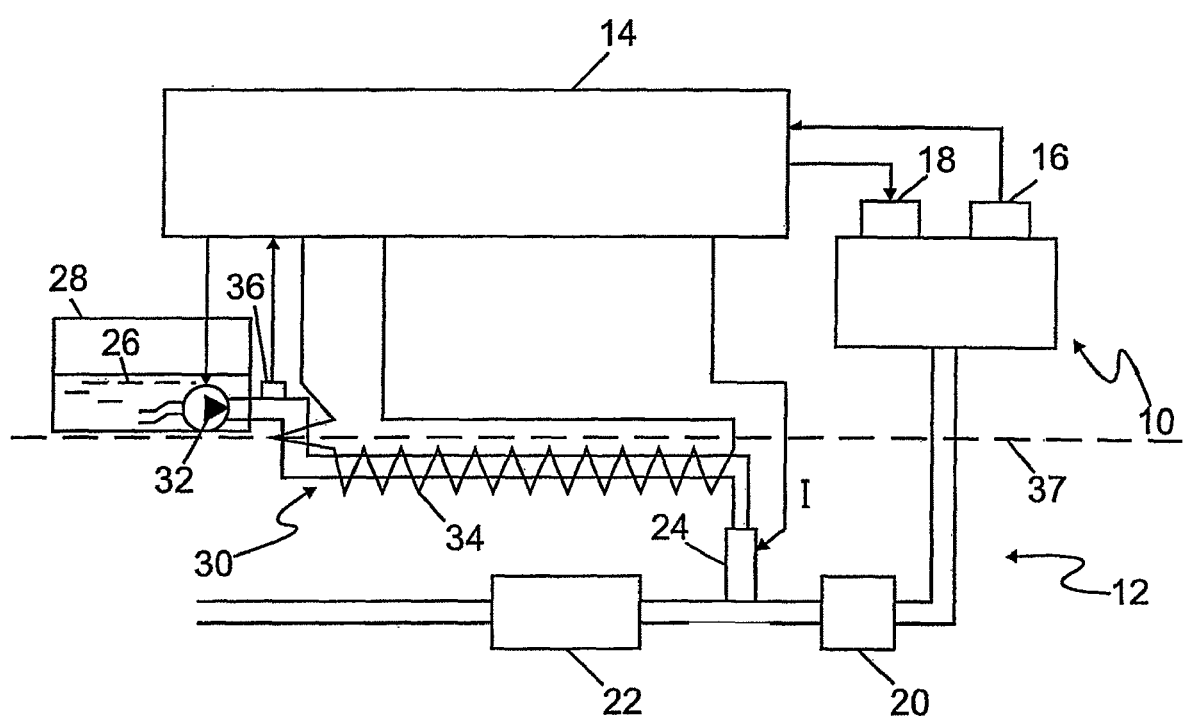
FIG. 1 the technical surrounding of the invention.

FIG. 1 shows a combustion engine 10 with a controller 14. The controller 14 is preferably the controller, which controls the combustion engine 10 and therefore receives signals from the sensors 16 about operating parameters of the combustion engine and processes them to correcting variables for controlling elements 18 of the combustion engine 10. The signals of the sensors 16 typically allow the controller 14 to determine the air mass that has been sucked in by the combustion engine 10, the rotation angle positioning of a crankshaft of the combustion engine 10 and the temperature of the combustion engine 10 etc. From these signals the controller 14 typically creates correcting variables for dosing fuel into combustion chambers of the combustion engine, for adjusting a manifold pressure of an exhaust gas turbocharger, an exhaust gas recirculation rate etc. Alternatively the controller 14 is a separate controller, which communicates with the controller of the combustion engine 10 over a bus system. In each case the controller 14 is arranged, particularly programmed, to implement the procedure according to the invention and/or one of its embodiments that are described in the following, which means to control the process of the procedure in each case and to implement the therefore necessary analyses.

The exhaust gas system 12 shows an oxidation catalyzer 20 and a SCR-catalyzer 22. A valve 24 is arranged between the oxidation catalyzer 20 and the SCR-catalyzer 24, by which the reducing agent 26 is dosed from a reservoir 28 to the exhaust gas. The valve 24 is electromagnetically operated and therefore controlled by the controller 12 with a control current I, which flows through a solenoid of the valve 24. Thereby the supply of the valve 24 with reducing agent 26 takes place over a feed line 30, which is fed with the reducing agent 26 by a pump 32. The pump 32 is preferably used as a controllable suction- and pressure-pump, which creates the injection pressure during pressure operation that is required for dosing of reducing agent 26 to the exhaust gas system 12 and which allows an emptying of reducing agent 26 from the feed line 30 during suction operation. Therefore the pump 32 is also controlled by the controller 14. Such an emptying takes for example place between two driving cycles, or rather at the end of a driving cycle in order to prevent a temporal freezing of the reducing agent 26 in the feed line 30, which is mostly implemented as a hose line, and in the valve 24. In order to prevent a freezing of the reducing agent 26, the feed line 30 is furthermore equipped with a hose line 34, which is also controlled by the controller 14. Alternatively or additionally a further heating is arranged in the reservoir 28, which is also controlled by the controller 14. A pressure sensor 36 detects a reducing agent pressure that has been created by the pump 32 before the valve 24. The dotted line 37 represents the vehicle underbody. The components that are arranged below the line 37, especially the feed line 30 and the valve 24, are directly exposed to the ambient temperature and the air stream and can therefore freeze.

FIG. 1 shows therefore especially the technical surrounding, in which the invention is used. Thereby it shall be understood that the invention is not limited to the configuration of combustion engine 10 with an exhaust gas system 12 and the depicted sensors 16, 36 and controlling elements 18, 24, 34 as shown in FIG. 1. Thus alternative embodiments can show several sensors, which detect operating parameters of the exhaust gas system 13 and provide the controller 14 with corresponding measured data. In one embodiment such sensors are temperature sensors and/or sensors for detecting the NOx concentration in the exhaust gas before and/or after the SCR-catalyzer 22 and/or a sensor, which detects the ammoniac concentration in the exhaust gas after the SCR-catalyzer 22 and thereby allows the detection of an overdosing of reducing agent 26.

Figure 2:
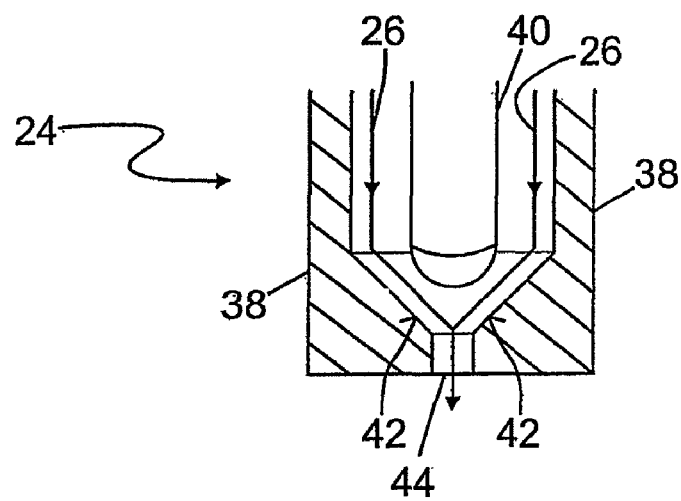
FIG. 2 mechanic and hydraulic details of the reducing agent metering valve.

FIG. 2 shows mechanic and hydraulic details of the valve 24. The valve 24 shows a valve body 38, which is strongly attached to the exhaust gas system 12. In the valve body 38 there is a seal body 40, for example a pintle, axially movable arranged, which is pressed by locking forces onto a valve seat 42, lifted by opening forces from the valve seat 42 and thereby releases a percolation profile 44, by which reducing agent 26 is dosed into the exhaust gas system 12.

Figure 3:
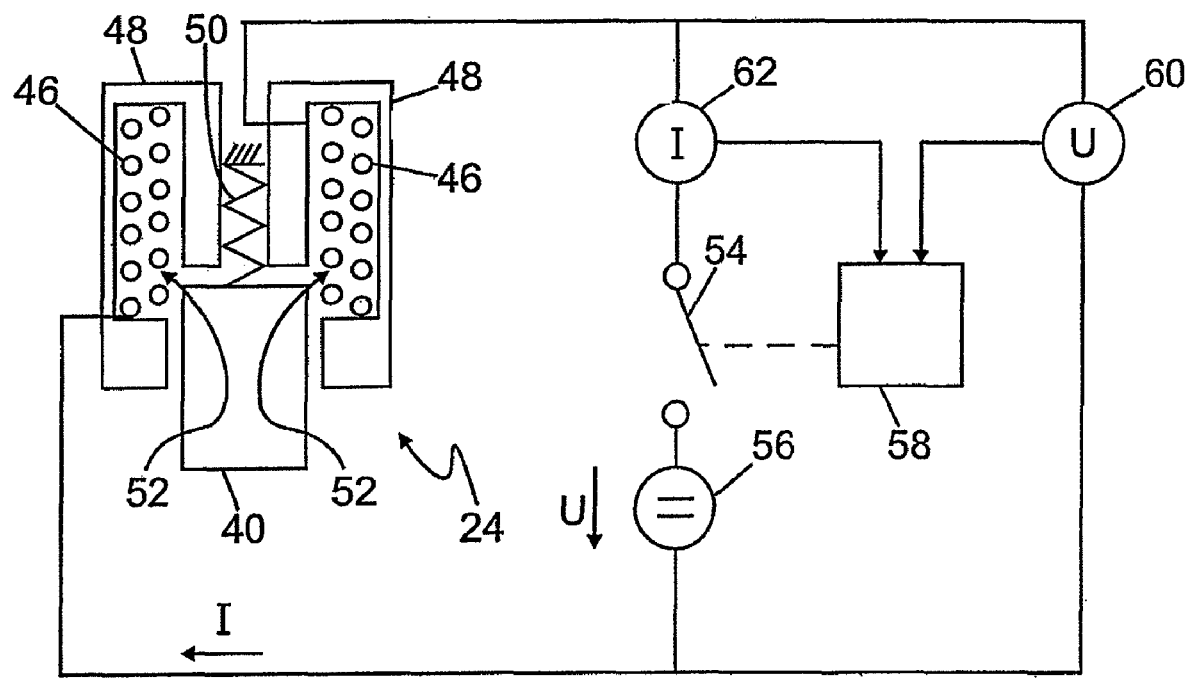
FIG. 3 the interaction of mechanic and electric features of the reducing agent metering valve.

FIG. 3 shows the interaction of mechanic and electric features of the valve 24. The valve 24 shows a solenoid 46 with an iron core 48. The movable seal body 40 is pressed by a spring 50 away from the iron core 48 onto the valve seat 42, so that an air gap 52 emerges between the iron core 48 and the movable seal body 40. The solenoid 46 is connected by a switch 54 to an electrical source of energy 56, which provides a voltage U. The switch 54 creates furthermore with the electric source of energy 56 a final stage, which is integrated into the controller 14. The switch 54 of the final stage is controlled by a control block 58, which represents the development of control signals, especially current profiles for the solenoid 46. The triggering takes especially place depending on the signal of a voltmeter 60, which detects a voltage U over the solenoid 46, and depending on the signal of an ammeter 62, which detects the amperage of a solenoid current or a control current I. If the switch 54 is closed, the solenoid 46 is fed with the current I and creates thereby an electromagnetic opening force, which pulls the movable seal body 40 into the air gap 52 and thus lifts from its valve seat 42.

Figure 4:
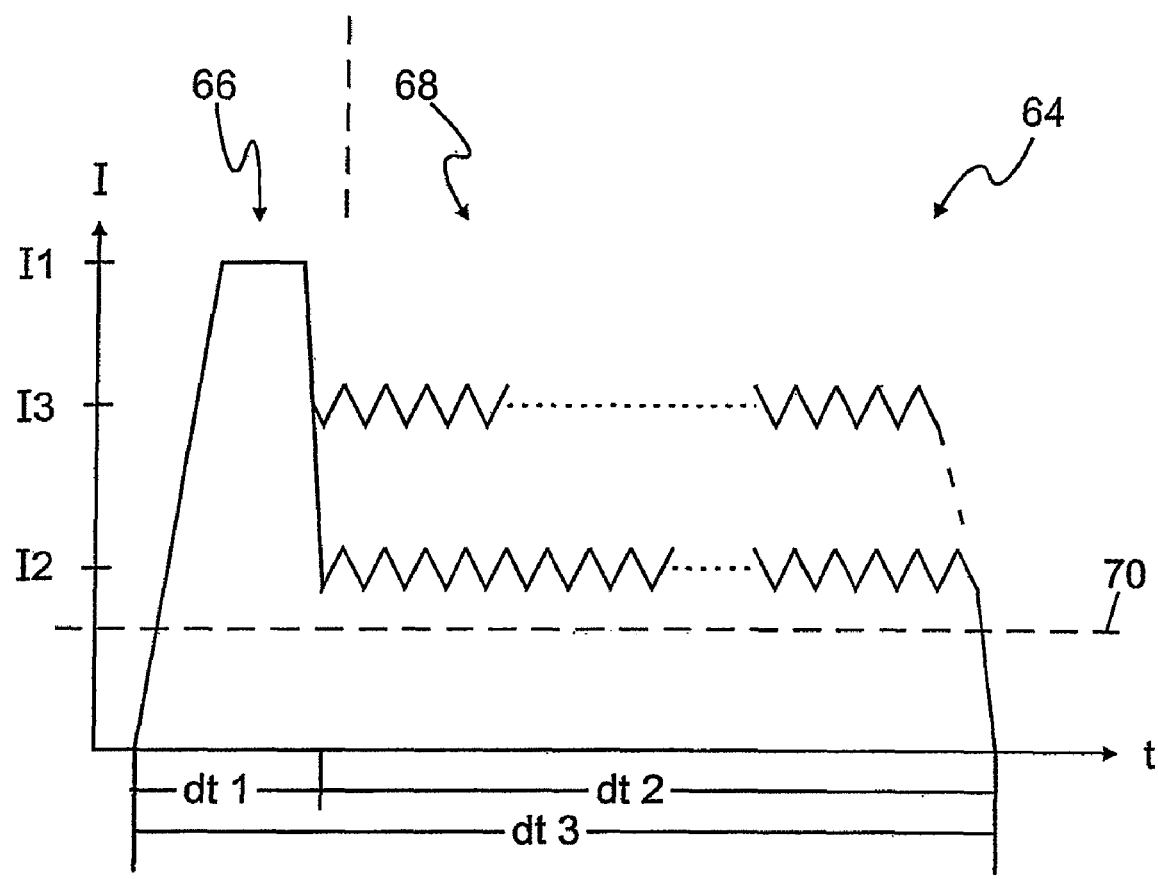
FIG. 4 a current profile which controls the reducing agent metering valve.

FIG. 4 shows an embodiment of a current profile 64, with which the valve 24 is controlled and which shows two consecutive sectors 66 and 68. Thereby the horizontally dotted line marks a current level 70, which is necessary for the opening and keeping open of the valve 24. In the first sector 66 of the length dt1 the current I is adjusted by the solenoid 46 of the valve 24 to a first comparably high value I1, in order to open the valve 24 quickly. Subsequent to the first sector 66 in the second sector 68 of the length dt2 a low current I2 is adjusted. But the low current I2 processes still above the dotted line, which marks a holding current level 70. As a result the valve 24 is opened and kept open with the current profile 64 by the sum dt3 of the times dt1 and dt2. If a danger of freezing exists or the valve 24 shall be defrosted, the electric energy that has been fed into the solenoid 46 by the electric current I is increased. This can takes place by extending the second sector 68 and/or by increasing the amperage I2 in the second sector 68 onto a value I3.

Figure 5:
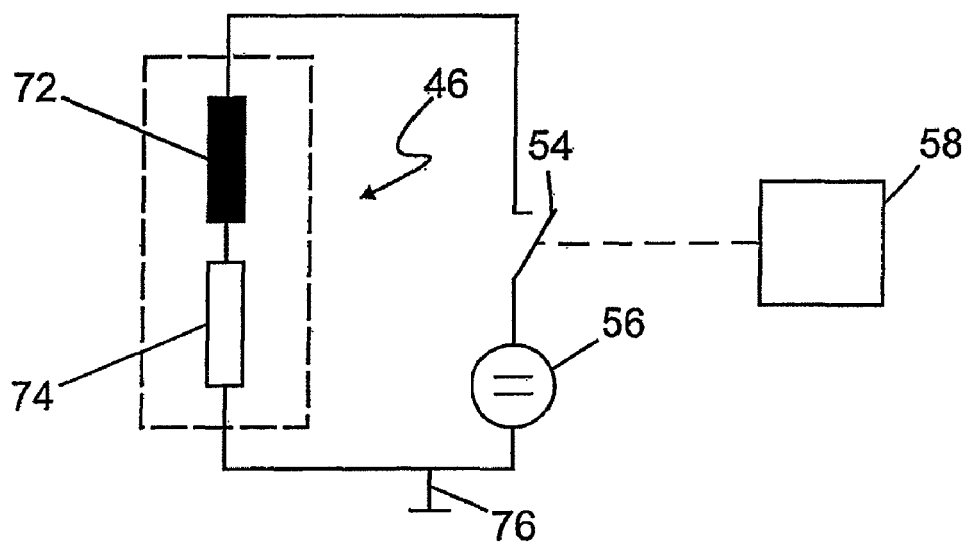
FIG. 5 an electric equivalent circuit diagram of the reducing agent metering valve.

FIG. 5 shows an electric equivalent circuit diagram of the valve 24 together with the final stage of the controller 14. In the equivalent circuit diagram of the valve 24 the solenoid 46 is shown as series connection of a pure inductance 72 and an Ohm resistance 74. A connection of a source of direct current voltage as source of electric energy 56 and a connection of the solenoid 46 of the valve 24 are each connected to a reference potential 74, for example a controller mass. The complementary connections of the solenoid 46 and of the source of direct current voltage that serves as source of energy 56 are connected with and separated from each other by the switch 54. The current profile 64 from FIG. 4 is created by the composition with the equivalent circuit diagram of FIG. 5 by a corresponding controlling of the switch 54. The current level I1, which is adjusted in the first sector 66, follows for example from the fact that the switch 54 is closed as long as the induction voltage of the inductance 72 after a closing of the switch 54 is so faded away that the entire or almost entire direct current voltage of the source of direct current voltage 56 adjusts over the solenoid 46.

The direct current voltage that has been provided by the source of direct current voltage 56 is preferably higher than a threshold voltage, at which a not frozen valve 24 opens. The current level I2 in the second sector 68 arises on the other side from the fact that the switch 54 is alternatively closed (current ramp) and opened (current drop) if the induction voltage has still not faded away.

A release of Joule heat goes with each current flow through the solenoid 46 of the valve 24 due to the Ohm resistance 74. If the valve 24 is controlled by the current profile 64, in order to dose the reducing agent, the release of heat can be disruptive. This is especially the case, if the dosing takes place at a hot exhaust gas system 12 and hot exhaust gas, because then the danger of a thermal damage of the valve 24, for example by overheating the solenoid, exists. The decreasing of the amperage from value I2 to value I2, which is still sufficient for opening the valve 24, decreases in this case the heat, which is released by the current I due to the Ohm resistance 74 of the solenoid 46.

At a low temperature of the exhaust gas system 12 and/or of the exhaust gas of the combustion engine 10 the release of Joule heat in the Ohm resistance 74 is used for a desired heating of the valve 24.

For a controlling of the feeding-in of electric energy into the solenoid 46 it is checked in the first sector 66 of the current profile 64, whether the valve 24 is frozen or whether a danger of freezing exists. In one embodiment therefore the voltage U over the solenoid 46 is detected with the voltmeter 60 from FIG. 3 and the amperage I as electric parameter of the solenoid 46 is detected with an ammeter 62 and evaluated in a control block 58. From these parameters I, U the electric resistance R=U/I is detected according to the Ohm's law and from that the temperature T=T(R) that varies with the resistance R. Subsequently the so determined temperature T(R) is compared to a preset threshold T_S, which separates temperature areas with and without a danger of freezing from each other. If T(R) is higher than the threshold T_S, the valve 24 is operated without specific heating measures by the current profile 64 and the holding current I2 from FIG. 4. If the temperature T(R) is on the other side lower than the threshold T_S, an operating of the valve 24 with an increased current level I3 takes place in the second sector 68. As a result an energy is set, which has been fed into the solenoid 46 in the second sector 68 with the electric current I depending on whether the valve 24 is frozen or a danger of freezing exists. Thereby more electric energy is fed in at a low electric resistance (low temperature) than at high electric resistance (high temperature).

The energy, which has been brought in, increases with an advancing amperage of the control current I. Insofar the area between the current level I2 and I3 in FIG. 4 represents a measure for the additionally spent electric energy, which is converted in the solenoid 46 into Joule heating warmth. Generally the increasing of the effective value (Root Mean Square-Value) of the solenoid current can cause a warming, while one can lower the value of the solenoid temperature by decreasing the effective value. This is used in one embodiment to regulate the solenoid temperature to a preset nominal value, which lies in the temperature area without a danger of freezing and at which no danger of an overheating of the solenoid exists. In a further embodiment a minimal solenoid current is therefore provided as lower barrier for the solenoid current, which is so determined that the valve 24 still stays open at the minimal value of the solenoid current.

Figure 6:
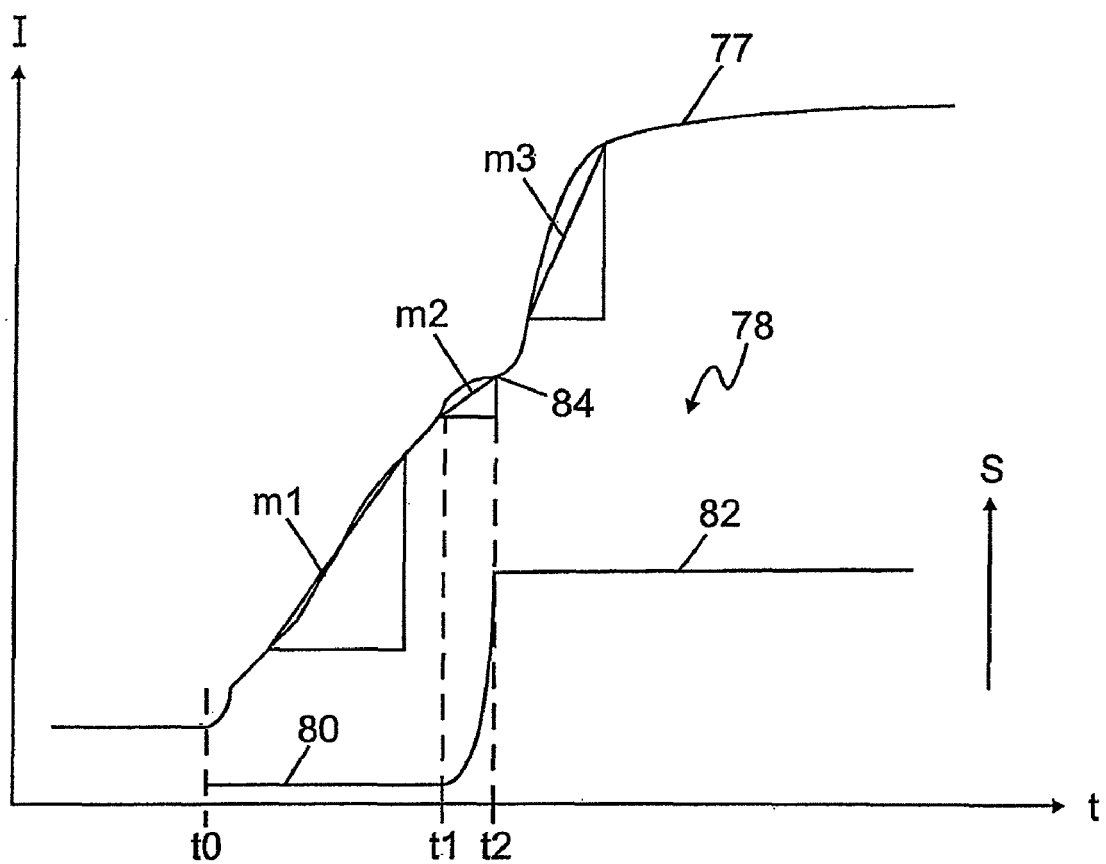
FIG. 6 an amperage course, in which the opening of the valve is illustrated.

A further embodiment provides that a course of the gradient of the amperage is detected and evaluated for the analysis of the behavior of the electric current I. FIG. 6 shows qualitatively such a course 77, in which a movement of the movable seal body 40 is illustrated. If the valve 24 is closed, the current I raises initially from a point of time t0 with a first gradient m1. At the point of time t1 the seal body 40 lifts from its valve seat 42 and moves to an end stop, which it reaches at a point of time t2. The curve 78 shows the distance s of the seal body 40 over the time schematically, whereby the lower level 80 represents the position at a closed valve 24 as first percolation profile and the upper level 82 the position of the seal body 40 at a completely opened valve 24 as a second percolation profile. As one can see the movement of the seal body 40 is mapped between the point of time t1 and t2 in a flatter gradient m2 of the current course 77, which lies between a higher starting gradient m1 and a higher further gradient m3. The values of the gradients m1 and m3 are different, since they occur at different positions of the seal body 40 and thereby at different expansions of the air gap 52.

Accordingly one embodiment of the procedure provides that it is checked for the analysis of the behavior of the electric current I whether the course of the gradient shows a fist gradient m1, which adjusts at a first percolation profile, and a further gradient m3, which adjusts at a second percolation profile.

If only one gradient m1 is shown in the course, this shows a missing movement of the seal body 40, which is characteristically for a frozen valve 24. Accordingly in this case the fed-in energy is adjusted to a higher value during further triggerings in the second sector 68, in order to defreeze the frozen valve 24. This can happen by extending the second sector 68 and/or by increasing the current level from value I2 to value I3 in the second sector 68 of FIG. 4.

In contrast the fed-in electric energy is set to a lower value during further activations, if the course of the current shows the first gradient m1 and the further gradient m3. The occurrence of the first gradient m1 and of the further gradient m3 after further, repeated triggerings shows in particular that the initially blocked seal body 40 comes loose.

An alternative embodiment provides that it is checked for the evaluation of the behavior of the electric current I whether the course 77 of the gradient shows an inflexion point 84, which is typical for a moving seal body 40.

It also applies here that the heating effect is increased, if no inflexion 84 is shown, because this indicates a frozen valve 24. If the course 77 however shows an inflexion point 84, an operating of the valve 24 takes place with a non-increased heating effect. Gradients m1, m2 and m3 arise from the fact that the change of positioning of the seal body 40 causes a change of the geometry of the air gap 52 in FIG. 3 and thereby a change of the correlation of the magnetic field and solenoid current I. The valve 24 is closed and the air gap 52 is present at the point of time t0 in FIG. 6. If the seal body 40 is however at a later point of time t2 at an end spot, which defines the maximum percolation profile, the air gap 52 is not present anymore or smaller, which leads to a changed gradient m3 in the current course 77. Therefore occurrence of gradients m1, m3 shows that the seal body 40 has moved. If only gradient m1 or m3 is shown, a blocked seal body 40 can be implied.

In this case the valve 24 is preferably controlled with an extended control time (extended second sector 68). Thereby the control is repeated until a movement of the seal body 40 is illustrated in the current course 77. The multiple triggering is necessary, because the mechanic movement is only shown in the first moment of the control in the current course. In this period of time the valve 24 is heated up over the entry of electric energy and the solenoid 46. It is important that during the triggering a determination of the temperature, for example over the inner resistance R of the solenoid 46, takes place, in order to prevent an overheating of the solenoid 46 if the valve 24 is still not fully defrosted. Due to this embodiment it can be realized, whether the seal body 40 is moving under the influence of the triggering with a current profile. But it cannot be determined whether the reducing agent 26 outside the valve 24, for example in the feed line 30, is still frozen.

Figure 7:
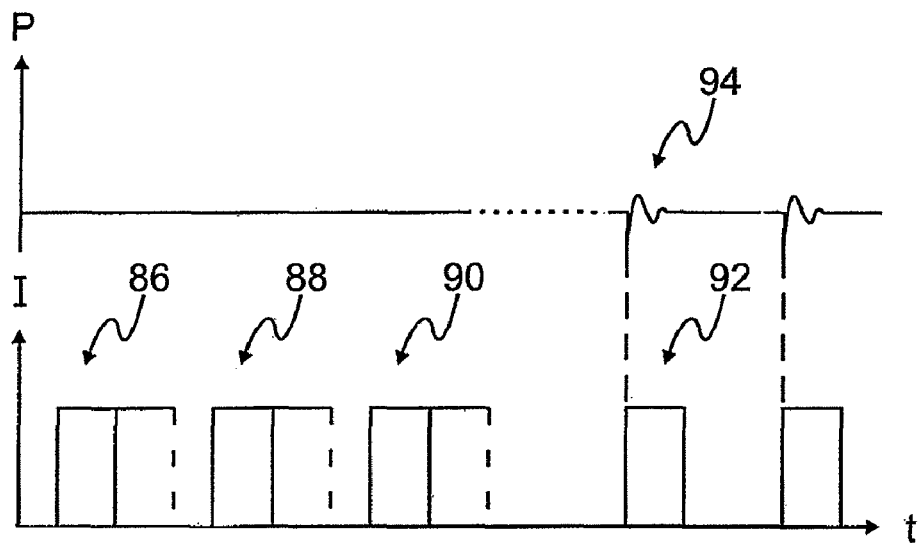
FIG. 7 an embodiment which is based on an analysis of temporal behavior of a reducing agent pressure.

FIG. 7 illustrates a further embodiment, which is based on an analysis of a temporal course of a pressure p of the reducing agent 26 in the feed line 30 during a triggering of the valve 24. The pressure p is detected in an embodiment with the pressure sensor 36 from FIG. 1. For dosing the reducing agent 26 a pressure p of about 5 bar is created in the feed line 30 before the valve 24 by a pump 32 in one embodiment. If the valve 24 opens due to a triggering with the current profile 92, the opening is only shown in the pressure course p(t) by a vibration process 94. But this is only the case if the reducing agent 26 is liquid also outside the valve 24. This embodiment allows therefore a more complete checking than the analysis of the current course, with which the flexibility of the seal body 40 in the valve 24 can only be determined.

If the valve 24 is triggered by a current profile 86 on the other side and this triggering is not shown in a temporal pressure breaking at the triggering, further triggerings 88, 90 take repeatedly place, at which each second sector of the current profile is extended (shown dotted), in order to heat the solenoid 46 and the frozen reducing agent in valve 24. The extension of individual current profiles 86, 88, 90 can not be to big, since temporally slow opening processes are not shown in the pressure course. The pressure change is in particular only shown in a form that can be evaluated, if the short-term pressure drop takes comparably prompt place during a triggering. One repeats therefore the triggering attempts with temporally separated current profiles 86, 88, 90, 92 in short distances so often until a pressure breaking 94 with a triggering is set in the temporal connection. Then the valve 24 has to be opened and can be operated normally again, that means without an increased energy input in the solenoid 46.

This embodiment can be implemented both during the pressure build-up (filling of the feed line 30), during filled feed line 30 and during pressure drop (emptying of the feed line 30). It is also important here, that in the period of the triggering a checking of the temperature of the valve 24 takes place, in order to prevent an overheating of the solenoid 46. With the embodiment of the pressure analysis it can be realized, whether the reducing agent metering system is frozen or free. Problems can occur, when no pressure drop is realized during a triggering and the missing pressure drop is conditioned by a leak in the system. It is therefore an advantage that the checking of the pressure course is combined with a density checking of the reducing agent metering system.

The invention claimed is:

1. A method of dosing a reducing agent to an exhaust gas of a combustion engine by control of a valve having a solenoid and a movable seal body for adjusting a flow cross-section of the valve, wherein the flow cross-section has a shape dependent on an electric current passing through the solenoid, the method comprising:
   actuating the valve by using a current profile having a plurality of over time consecutive portions;
   adjusting the electric current to a first current level during a first portion of the current profile;
   assessing the status of the valve during the first portion, wherein it is determined if the valve is frozen or in danger of freezing;
   adjusting the electric current applied to the solenoid to a second current level during a second portion, wherein the magnitude of the electric current applied to the solenoid during the second portion is dependent on the status of the valve determined during the first portion; and
   determining if a course of amperage exhibits at least a first gradient and a further gradient, in that the first gradient adjusts at a first flow cross-section and the further gradient adjusts at a second flow cross-section, wherein a fed-in electric current is set to a low value if the course exhibits the first gradient and a second gradient and the fed-in electric current is set to a higher value if the course only shows the first gradient.

2. A method according to claim 1, further comprising evaluating the behavior of at least one electrical parameter of the solenoid, wherein the evaluation occurs during the valve status assessment undertaken in the first portion.

3. A method according to claim 2, wherein the at least one electrical parameter includes at least an amperage of the electric current and a voltage that is applied to the solenoid, in that the ohmic resistance of the solenoid is concluded from the specific values of the amperage and from the voltage that is driving the electric current, and in that more electric current is fed in at a low electric resistance that at a high electric resistance.

4. A method according to claim 2, wherein the course of amperage is evaluated for an analysis of the behavior of a solenoid electric current.

5. A method according to claim 4, further comprising determining if the course exhibits an inflection point, wherein the presence of an inflection point is typical for a movable seal body.

6. A method according to claim 1, wherein it is determined during the valve assessment in the first portion whether a triggering/current feeding-in is illustrated in the temporal course of a reducing agent pressure that has been detected before the valve, and in that the fed-in electric current is increased, if this is not the case.

7. A method according to claim 6, wherein the temporal length of the second portion is increased or an average amperage is increased in the second portion, thereby increasing the fed-in electric current.

8. A method according to claim 6, further comprising repeatedly checking whether a triggering/current feeding-in is illustrated in the temporal course of a reducing agent pressure or in the course of the amperage.

9. A customized controller for controlling a valve for implementation of a method for dosing a reducing agent to an exhaust gas of a combustion engine by control of a valve having a solenoid and a movable seal body for adjusting a flow cross-section of the valve, wherein the flow cross-section has a shape dependent on an electric current passing through the solenoid, the method comprising:

actuating the valve by using a current profile having a plurality of over time consecutive portions;

adjusting the electric current to a first current level during a first portion of the current profile;

assessing the status of the valve during the first portion, wherein it is determined if the valve is frozen or in danger of freezing;

adjusting the electric current applied to the solenoid to a second current level during a second portion, wherein the magnitude of the electric current applied to the solenoid during the second portion is dependent on the status of the valve determined during the first portion; and determining if a course of amperage exhibits at least a first gradient and a further gradient, in that the first gradient adjusts at a first flow cross-section and the further gradient adjusts at a second flow cross-section, wherein a fed-in electric current is set to a low value if the course exhibits the first gradient and a second gradient and the fed-in electric current is set to a higher value if the course only shows the first gradient.

* * * * *